No. 707,754. Patented Aug. 26, 1902.
W. L. BLISS.
BRUSH MECHANISM FOR DYNAMOS.
(Application filed Feb. 3, 1902.)
(No Model.)
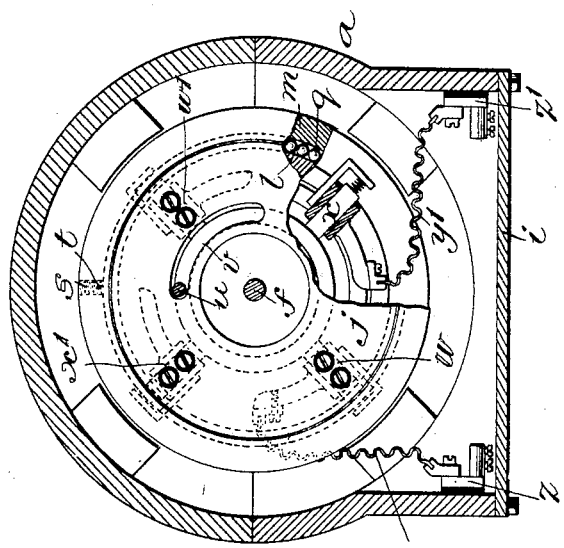
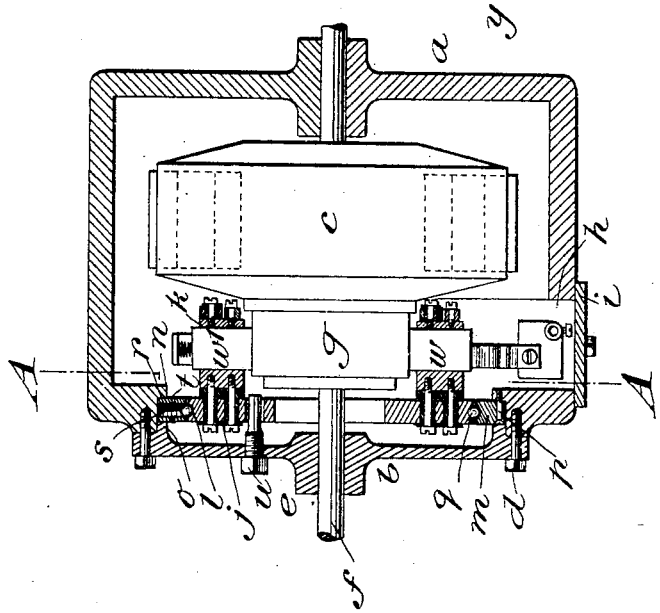
Witnesses:
George Barry Jr
Henry Thieme.
Inventor:
William Lord Bliss
by attorneys

UNITED STATES PATENT OFFICE.

WILLIAM LORD BLISS, OF BROOKLYN, NEW YORK, ASSIGNOR TO BLISS ELECTRIC CAR LIGHTING COMPANY, OF NEW YORK, N. Y., A CORPORATION OF NEW JERSEY.

BRUSH MECHANISM FOR DYNAMOS.

SPECIFICATION forming part of Letters Patent No. 707,754, dated August 26, 1902.

Application filed February 3, 1902. Serial No. 92,408. (No model.)

*To all whom it may concern:*

Be it known that I, WILLIAM LORD BLISS, a citizen of the United States, and a resident of the borough of Brooklyn, in the city and State of New York, have invented a new and useful Brush Mechanism for Dynamos, of which the following is a specification.

My invention relates to brush mechanism for dynamos, with the object in view of providing automatically for the constant polarity of a dynamo in whichever direction it may rotate and notwithstanding changes or reversal of the direction of the rotation.

The invention may be applied to all dynamos the direction of the rotation of which is required to be or liable to be reversed, but the polarity of which is required to be constant; but it is especially applicable to dynamos deriving motion from running-gear of railway-vehicles for the purpose of charging storage batteries or furnishing a direct electrical current for the illumination of such vehicles.

The particular form of dynamo which I have illustrated for the purpose of showing a practical embodiment of my invention is a four-pole machine; but it is to be understood that it may apply to a machine having more or less than four poles, as may be desired.

In the accompanying drawings, Figure 1 is a view in vertical section from front to rear through the casing of the dynamo, showing the supports for the rotary armature and commutator and the brush-holder in relation thereto as it appears in use; and Fig. 2 is a transverse section taken on the plane of the line A A of Fig. 1, the front cover of the casing being removed.

The body of the casing is denoted by $a$. The front of the casing $a$ is closed by a removable cover $b$, arranged to cover an opening in the casing sufficiently large to permit the brush-carrier $j$ to be inserted and removed at pleasure. The cover $b$ is here shown as made removable by means of screws $d$, extending through its edges into the casing $a$, and the said cover is provided centrally with a hub $e$, which forms a bearing for the shaft $f$, carrying the rotary armature $c$ and commutator $g$. The casing $a$ is further provided with an opening $h$ at its bottom, located beneath the brushes, and this opening is closed by a removable plate $i$ for the purpose of gaining access to the interior of the casing $a$ to manipulate the brushes and also for the purpose of blocking the armature $c$ in position when for any reason it is desirable to remove the front cover $b$ to gain access to the brush-support. The brush-carrier consists of an annular rotatable inner ring $j$, upon which are secured and properly insulated therefrom the brush-holders $k$. The inner ring $j$ has a semicircular groove or ball-race $l$ formed in its periphery. The inner ring $j$ is mounted within an outer or stationary ring $m$, having on its inner wall a semicircular groove or ball-race. The outer ring $m$ may be held securely in position within the front opening in the casing $a$ back of the cover $b$ by permitting the outer portion of its inner face to rest against an annular flange $n$, formed around the margin of the opening in the casing, and its outer face engaged by an annular flange $o$, extending from the inner face of the cover $b$. The pressure of the cover on the outer ring may be sufficient to hold it in place, or it may be secured by means of one or more screws $p$, extending through its margin into the flange $n$ of the casing. The inner ring $j$ is held in position within the outer stationary ring $m$ by a series of bearing-balls $q$, contained in the races formed, respectively, on the periphery of the inner ring and on the interior face of the outer ring. These bearing-balls are inserted in position after the inner ring is placed in position within the outer ring by passing them through a radial passage $r$ in the outer ring. The passage $r$ is formed by drilling a hole the diameter of a ball and then screw-threading its interior for the reception of a plug-screw $s$, which is to fill the hole after the balls have been inserted. The screw $s$ is fitted to the tapped hole $r$ previous to the turning of the race in the outer ring. A small hole $t$ is drilled through the ring $m$ and the screw $s$ and a pin fitted therein, which serves to prevent the screw $s$ from moving while the race of the ring $m$ is being turned and also serves subsequently to lock the plug-screw in its position, with its inner end registering with the curve of the raceway. In forming the raceway after the screw has been inserted the inner end of the screw is cut away to correspond with the semicircular raceway, and the screw itself forms a part of the raceway when finally inserted. After a sufficient number of balls have been inserted—a number, for instance, sufficient to substantially fill without crowding the raceway—the screw $s$ is inserted to where the hole $t$ through the screw registers with the corresponding hole through the ring. The locking-pin is then inserted through the hole $t$ and riveted down at its ends to lock the screw-plug in its position, and thereby make the raceway complete. The balls $q$ serve when in position to lock the rotary inner ring, to which the brush-holders are secured, in rotary adjustment within the exterior ring $m$.

The reciprocating rotary movement of the inner ring $j$, carrying the brushes, is limited by means of a stop-pin $u$, having a screw-threaded engagement with the cover $b$ and extending inwardly within a curved slot $v$, formed in the ring $j$. The length of the slot $v$ is such as to permit the ring $j$ to rock the required distance to shift the brushes and give the necessary lead, and in the present instance, where the machine is a four-pole machine, this distance is equal to or a little more than a quadrant. It is important that the stop-pin $u$ be made removable, for reasons which will be hereinafter stated, and one convenient way of making it removable is to give it a screw-threaded connection with the cover $b$.

The opposite brushes of like polarity, $w w'$ and $x x'$, are connected together in the usual way, (not shown,) and one of each pair, in the present instance $w$ and $x$, is connected with a binding-post by a suitable flexible conductor. In the present instance the brush $w$ is connected, by a flexible band-conductor $y$, with the binding-post $z$, and the brush $x$ is connected, by the flexible band-conductor $y'$, with the binding-post $z'$.

In operation the reversing of the rotary movement of the armature $c$ will through the frictional contact of the brushes with the commutator $g$ carry with it the rotary ring $j$, supporting the brushes, until the rotary movement of the ring $j$ is interrupted by the engagement of the stop-pin $u$ with the opposite end of the curved slot $v$. This rotary movement of the brushes will be sufficient to change their respective positions with relation to the commutator—viz., the brushes $w$ and $w'$ will have been rocked into the position formerly occupied by the brushes $x$ and $x'$, or vice versa, as the case may be, and this will cause the polarity of the brushes to remain constant.

Among the prominent advantages of the structure hereinabove set forth special attention is called to the simple manner in which the brush-carrying ring, with brush-holders attached thereto, may be bodily removed from the front of the casing by simply removing the cover $b$ and releasing the outer ring $m$ from the casing, the conductors $y$ and $y'$ having been previously disengaged from their binding-posts by the operator working through the opening in the bottom of the casing covered by the plate $i$. The opening $h$ in the bottom of the casing furthermore admits of the operator inserting a support under the armature $c$ to block it in position to permit the cover $b$, with its bearing-hub $e$, to be slid off the shaft without permitting the latter to be displaced or strained by the removal of the bearing-hub $e$. The removable plate $i$ also furnishes ready access to the brushes without removing any part of the structure except the stop-pin $u$ and the release of the conductors $y \; y'$, since the removal of the stop $u$ permits the disk $j$ to be turned completely around, bringing each of the brushes into position to be manipulated through the opening $h$ in the bottom of the casing. This is of very great importance where the casing is secured beneath the floor of a car or close to a ceiling where access at frequent intervals can only conveniently be had from beneath.

It is obvious that changes might be resorted to in the form and arrangement of the several parts without departing from the spirit and scope of my invention. Hence I do not wish to limit myself strictly to the structure herein set forth; but

What I claim is—

1. The combination with a rotary armature and commutator, of brush-holders, a rocking support for the brush-holders and a removable stop for limiting the rocking movement of said support, substantially as set forth.

2. In a brush mechanism for dynamos, a rotating member, brush-holders provided with brushes, a rocking support for the said brush-holders, means for transmitting a rotatory movement to said support from said rotating member, and a removable stop for limiting the rotatory movement of said support, substantially as set forth.

3. In a brush mechanism for dynamos, a rotating member, brush-holders provided with brushes, a rocking support for said brush-holders, means for transmitting a rotatory movement to said support from said rotating member, and a removable stop for limiting the rotatory movement of the said support in each of two opposite directions, substantially as set forth.

4. The combination with a casing provided with an opening in its base and a rotary armature and commutator mounted within the casing, of brush-holders, a rocking support for the brush-holders and a removable stop for limiting the rocking movement of the said support whereby access to the several brush-holders and brushes may be obtained through the bottom of the casing, substantially as set forth.

5. Brush mechanism for dynamos comprising a ring, rolling bearings at the periphery of the ring, brush-holders carried by the ring and means for limiting the rotary movement of the ring in each of two opposite directions, substantially as set forth.

6. Brush mechanism for dynamos comprising a rotary ring, a stationary ring, a raceway intermediate of the two rings, bearing-balls located in said raceway and serving to hold the rings in rotatable relation with each other, brush-holders carried by the rotary ring and means for limiting the rotatory movement of the said rotary ring, substantially as set forth.

7. Brush mechanism for dynamos comprising an inner rotary ring, an outer stationary ring, a raceway intermediate of the two rings, bearing-balls located in said raceway, brush-holders carried by the inner ring and means for limiting the rotary movement of the inner ring in each of two opposite directions, substantially as set forth.

8. A brush mechanism for dynamos comprising a stationary outer ring, a rotary inner ring, a raceway intermediate of the two rings, bearing-balls located in said raceway and serving to hold the inner ring in position within the outer ring, brush-holders carried by the said inner ring and means for limiting the rocking movement of the inner ring in each of two opposite directions, substantially as set forth.

9. The brush mechanism for a dynamo comprising an outer ring provided with one part of a raceway in its inner face, a hole leading from the exterior surface of the ring to the part raceway, means for plugging the hole to complete the wall of the raceway, an inner ring fitted to rotate within the outer ring and provided with part of a raceway in its periphery, bearing-balls located in the raceway and serving to hold the inner ring in position with respect to the outer ring, brush-supports carried by the inner ring and means for limiting the rocking movement of the inner ring, substantially as set forth.

10. The combination with a casing and a rotary armature and commutator mounted within the casing, of an outer stationary ring fitted in an opening at the front of the casing, a removable cover for closing the opening in front of the casing, an inner ring fitted to rotate within the said outer ring, the said inner and outer rings being each formed on their adjacent faces with parts of a raceway, bearing-balls serving to hold the inner ring in position within the outer ring and means for limiting the rocking movement of the inner ring, substantially as set forth.

11. The combination with a casing and a rotary armature and commutator mounted within the casing, of an outer stationary ring fitted in an opening at the front of the casing, a removable cover for closing the opening in the front of the casing, an inner ring fitted to rotate within the said outer ring, the said inner and outer rings being each formed on their adjacent faces with parts of a raceway, bearing-balls serving to hold the inner ring in position within the outer ring and a stop carried by the said removable cover for limiting the rocking movement of the inner ring, substantially as set forth.

12. The combination with a casing provided with an open front and an opening in its base, of a rotary armature and commutator mounted within the casing, a removable cover for the front of the casing and provided with a bearing for the armature and commutator and shaft, a removable plate forming a cover for the opening in the base of the casing, an outer stationary ring fixed in the opening at the front of the casing, an inner rocking ring mounted within the outer stationary ring, brush-holders carried by the inner rocking ring in position to be manipulated through the opening in the base of the casing and a removable stop for limiting the rocking movement of the inner ring, substantially as set forth.

In testimony that I claim the foregoing as my invention I have signed my name, in presence of two witnesses, this 28th day of January, 1902.

WILLIAM LORD BLISS.

Witnesses:
   FREDK. HAYNES,
   HENRY THIEME.

DISCLAIMER.

707,754.— *William Lord Bliss*, Brooklyn, N. Y. BRUSH MECHANISM FOR DYNAMOS. Patent dated August 26, 1902. Disclaimer filed October 28, 1912, by the present assignee, *The United States Light & Heating Company*.

Enters its disclaimer—

"To so much of claim 6 of said patent as may describe a brush mechanism in which the stationary ring is not separable from the armature with its commutator and from the body of the field magnet casing, so that the brush mechanism may be bodily removed without dismembering the rotary and stationary rings and the bearing balls which lock or tie them together; and in which the means for limiting the rotary movement of the rotary ring is not such as to permit movement sufficient to change the respective positions of the brushes with relation to the commutator to cause the polarity of the brushes to remain constant regardless of the direction of rotation of the armature of the dynamo."

[*Official Gazette, November 5, 1912.*]